United States Patent [19]

Sundermann et al.

[11] 4,059,567
[45] Nov. 22, 1977

[54] HIGH MOLECULAR WEIGHT POLYTRIAZINES OF SOLUBLE POLYMERIC N-CYANO-ISOUREA ETHERS

[75] Inventors: Rudolf Sundermann, New Martinsville, W. Va.; Günther Rottloff, Cologne; Ernst Grigat, Odenthal-Gloebusch, both of Germany

[73] Assignee: Bayer Aktiengesellschaft, Germany

[21] Appl. No.: 707,553

[22] Filed: July 22, 1976

[30] Foreign Application Priority Data

July 24, 1975 Germany .............................. 2533121

[51] Int. Cl.² .............................................. C08G 73/08
[52] U.S. Cl. .................................. 260/47 R; 260/49; 260/61
[58] Field of Search .................... 260/47 R, 49, 61

[56] References Cited

U.S. PATENT DOCUMENTS

| | | | |
|---|---|---|---|
| 3,502,617 | 3/1970 | Schminke et al. | 260/47 |
| 3,694,410 | 9/1972 | Oehmke | 260/47 R |
| 3,738,962 | 6/1973 | Loudas et al. | 260/47 R |
| 3,960,783 | 1/1976 | Seltzer et al. | 260/2 R |

*Primary Examiner*—Lester L. Lee
*Attorney, Agent, or Firm*—Connolly and Hutz

[57] ABSTRACT

Polyfunctional aminophenols or amino(alkyl)phenols are converted with cyano halide in the presence of a base at temperatures below 65° C into the corresponding aromatic cyanic acid esters containing cyanamide groups and thereafter at 65° C to 150° C into prepolymers which are soluble in organic solvents and highly stable in storage. The prepolymers may be converted into high molecular weight polymers of triazine structure by heating to 150° C to 350° C. The end products are insoluble in solvents and are infusible. The prepolymers may be used for the production coatings, shaped articles or laminates.

2 Claims, No Drawings

HIGH MOLECULAR WEIGHT POLYTRIAZINES OF SOLUBLE POLYMERIC N-CYANO-ISOUREA ETHERS

This invention relates to high molecular weight polytriazines and to a process for their production by heat treating soluble, polymeric N-cyano-isourea ethers which in turn have been obtained by the polyaddition of aromatic cyanic acid esters containing cyanamide groups.

It is known from DT-PS No. 1,190,184 that high molecular weight polytriazines can be obtained by polymerising difunctional or polyfunctional aromatic cyanic acid esters at an elevated temperature, optionally in the presence of polymerisation promoters.

In addition, it is known from Japanese Application JA 6265/66 that primary diamines can be reacted with cyanogen halide to form di(cyanamides) which may be processed into polymers.

The polymerisation of polyfunctional cyanamides of secondary amines with catalytic to more than molar quantities of mono- or poly-hydroxyl and/or thiol compounds at temperatures of from 50° C to 250° C to form polymeric products, is also known, cf. DT-OS No. 1,595,651.

Finally, a process for the production of macromolecular polyguanidines by reacting N,N'-dicyanamides of the formula NC—NH—R—NH—CN on their own or with an N,N'-dicyanamide of the formula NC—NR'—R—NR'—CN (where R and R' represent hydrocarbon radicals), is known from NE-PS No. 55,826.

It has now been found that high molecular weight polytriazines can be obtained by reacting compounds corresponding to the general formula (I):

$$(H_2N — R)_n — Ar — (OH)_m \qquad (I)$$

in which Ar represents an aromatic radical or an aromatic radical connected by bridge members, R is a single bond, an alkylene group with from 1 to 9 carbon atoms or an alkylene group with from 1 to 9 carbon atoms substituted by $C_1$-$C_4$-alkyl radicals or phenyl, and $m$ and $n$ each represent one of the numbers 1, 2 or 3, or their phenolates, with cyanogen halide in the presence of a base at temperatures below 65° C to form the corresponding aromatic cyanic acid esters containing cyanamide groups, converting the cyanic acid esters thus obtained at an elevated temperature into a prepolymer soluble in organic solvents or into a fusible prepolymer, and allowing the prepolymer to react to completion at elevated temperatures to form a high molecular weight polymer of polytriazine structure which is substantially insoluble in solvents.

Aminophenols and amino(alkyl)phenols, which may be used as starting compounds for the process according to the invention, are known in large numbers. It is possible to use virtually any aromatic and aromatic-heterocyclic, optionally substituted compounds which have one or more phenolic hydroxyl groups one or more primary amino groups optionally attached through an aliphatic radical.

The amino(alkyl)phenols preferably correspond to the general formula (II):

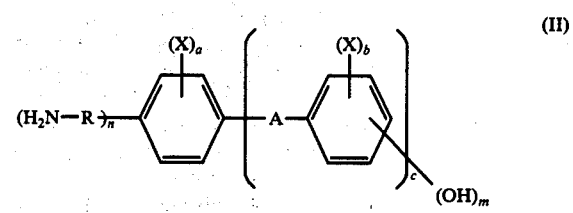

in which
R is a single bond or an alkylene group with from 1 to 9 carbon atoms optionally substituted by $C_1$-$C_4$ alkyl or phenyl;

X = hydrogen, halogen, linear or branched $C_1$-$C_9$ alkyl, phenyl, or two adjacent alkyl radicals on the same nucleus together form a carbocyclic 5-membered or 6-membered ring or together and in conjunction with a hetero atom (O, S, N or P) form a 5- or 6-membered heterocyclic ring, or the group

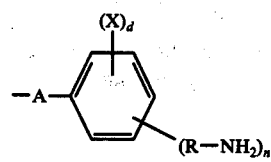

A = oxygen, the sulphonyl group (—$SO_2$—), the carbonyl group (CO), the carbonyl dioxy group

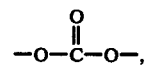

an alkylene group with from 1 to 9 carbon atoms optionally substituted by $C_1$-$C_4$ alkyl radicals or phenyl, a cycloaliphatic or aromatic 5-membered or 6-membered ring or a single bond;
$n$ = one of the numbers 1, 2 or 3;
$m$ = one of the numbers 1, 2 or 3;
$a$ = 5-$n$ where $c$ = 1 and 6-$m$-$n$ where $c$ = 0;
$b$ = 5-$m$;
$c$ = 0 or 1; and
$d$ = 5-$n$.

The symbols used in formula (II) above have the following meanings in particular:
R = a single bond, an alkylene group with from 1 to 6 carbon atoms or an alkylene group with from 1 to 6 carbon atoms substituted by methyl or phenyl;
X = hydrogen, chloride or bromine, more especially chlorine, linear or branched $C_1$-$C_4$ alkyl groups, or two radicals X, which substitute adjacent C-atoms, form with those carbon atoms a carbocyclic 6-membered ring (for example a benzene ring);
A = oxygen, the sulpho group, the carbonyl group, the carbonyl dioxy group, a linear or branched alkylene group with from 1 to 4 carbon atoms or a single bond;
$n$ = the number 1 or 2, more especially the number 1;
$m$ = the number 1 or 2, more especially the number 1;
$a$ = the number 1 or 2, more especially the number 1;
$b$ = the number 1 or 2, more especially the number 1; and
$c$ = the number 0 or 1.

If, in formula (II), the aromatic nucleus is substituted by several radicals X, the substituents may be the same or different.

The following are mentioned as examples of compounds corresponding to the general formula (II): m,p-aminophenol, 2-methyl-4-aminophenol, 2-methyl-5-aminophenol, 3-methyl-4-aminophenol, 3-methyl-5-aminophenol, 4-methyl-3-aminophenol, 2,4-dimethyl-5-aminophenol, 2,5-dimethyl-4-aminophenol, 2,6-dimethyl-3-aminophenol, 2,6-dimethyl-4-aminophenol, 3,5-dimethyl-4-aminophenol, 6-chloro-3-aminophenol, 3-chloro-4-aminophenol 2-ethyl-4-aminophenol, 2-isopropyl-4-aminophenol, 3-methyl-5-ethyl-4-aminophenol, 2,3,5-trimethyl-4-aminophenol, 2-sec.-butyl-4-aminophenol, 2-tert.-butyl-4-aminophenol, 2-isopropyl-5-methyl-4-aminophenol, 3-methyl-5-isopropyl-4-aminophenol, 2,6-diisopropyl-4-aminophenol, 2,6-di-tert.-butyl-4-aminophenol, 4-aminomethyl phenol, 4-amino-ethyl phenol, 5-amino-α-naphthol, 6-amino-α-naphthol, 5-amino-β-naphthol, 7-amino-β-naphthol, 8-amino-β-naphthol, 2-(4-aminophenyl)-2-(4-hydroxyphenyl)-propane, 4-amino-4'-hydroxy diphenyl, 4-amino-4'-hydroxy diphenyl ether, 4-amino-4'-hydroxy diphenyl sulphone and 4-amino-4'-hydroxy diphenyl methane.

The process according to the invention is illustrated for example by the following reaction scheme ($x > 2$), the terminal groups representing cyanamide and cyanate groups:

tones, hydrocarbons, chlorinated hydrocarbons or mixtures thereof.

In cases where it is desired to use particularly pure aromatic cyanic acid esters containing cyanamide groups that are highly stable in storage, it is advisable to adopt a procedure similar to that described in our copending U.S. Applications, Ser. Nos. 658,814 or 658,815 which relate to the production of highly pure polyfunctional cyanic acid esters without any cyanamide groups.

According to our copending U.S. Application, Ser. No. 658,814, filed Feb. 17, 1976, di- or polytrialkyl ammonium phenolates (for example polytriethyl ammonium phenolates) are reacted with an excess of cyanogen halide in an organic solvent, optionally in the presence of catalytic quantities of trialkylamines, such as triethylamine, to form the corresponding aromatic cyanic acid esters.

According to our copending U.S. Application, Ser. No. 658,815, filed Feb. 17, 1976 alkali or alkaline earth salts, preferably sodium, potassium, calcium and barium salts of aromatic di- or poly-hydroxy compounds are reacted with cyanogen halide in a solvent, optionally in the presence of catalytic quantities of a tertiary amine.

In cases where aminophenols or amino(alkyl)phenols are used instead of the dihydroxy or polyhydroxy com-

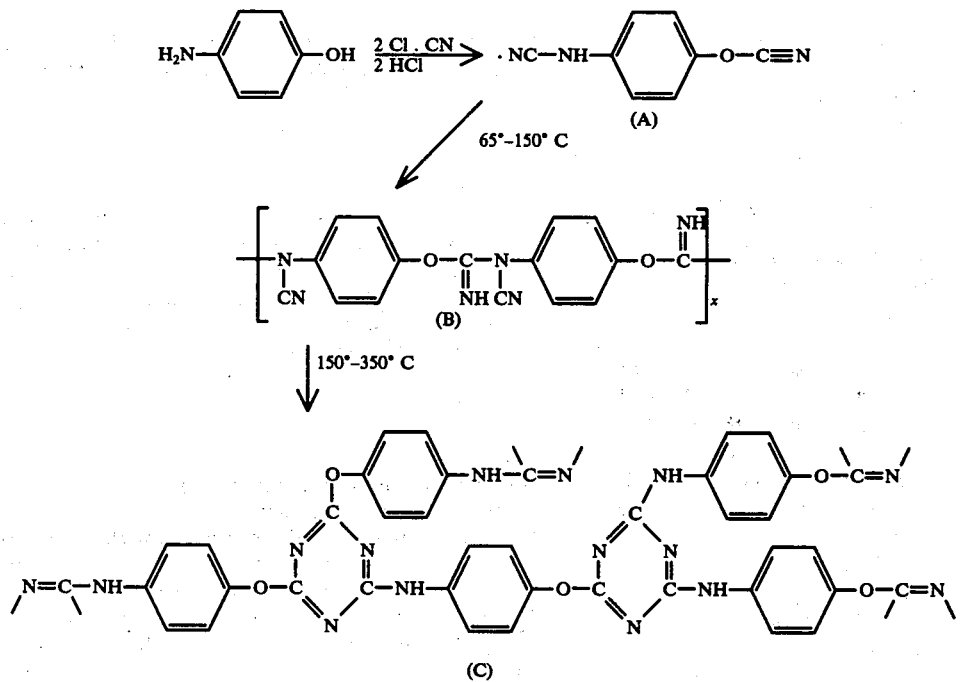

The aromatic cyanic acid esters containing cyanamide groups (in the exemplified equation, formula A) may be prepared in solution and/or suspension by reacting the amino-(alkyl)phenol with cyanogen halide in the presence of a base by the methods known from GB-PS No. 1,007,790 for the production of aromatic cyanic acid esters: from 1 to 1.1 moles of cyanogen halide and 1 mole of a base or base mixture may be used for every primary amino group and for every phenolic hydroxyl group. The reaction temperatures may be in the range of from −40° C to +65° C. Suitable bases are inorganic bases such as sodium hydroxide, potassium hydroxide, soda, potash, calcium hydroxide, or tertiary amines such as trimethylamine or triethylamine, whilst suitable solvents or suspending agents are water, alcohols, kepounds, from 1 to 2 moles and preferably from 1 to 1.4 moles of cyanogen halide, and from 1 to 1.8 moles, preferably from 1 to 1.3 moles, of a base or base mixture may be used for every primary amino group and for every phenolic hydroxyl group, the base or the base mixture always being used in a deficit relative to the cyanogen halide.

Examples of suitable solvents are water; lower aliphatic alcohols such as methanol, ethanol, propanol, isopropanol or butanol; aliphatic ketones such as acetone, methylethyl ketone, diethyl ketone, methylisopropyl ketone or methylisobutyl ketone; aliphatic or aromatic hydrocarbons, preferred aliphatic hydrocarbons being the fractions accumulating during distillation of naturally occurring mixtures, such as petroleum ether, light petrol or petrol, whilst examples of aromatic hydrocarbons are benzene, toluene, and xylenes; aliphatic and aromatic chlorinated hydrocarbons, such as dichloromethane, dichloroethane, perchloroethylene, chlorobenzene or dichlorobenzene; ethers such as diethyl ether, diisopropyl ether, dioxane, tetrahydrofuran or di-sec.-butyl ether; nitrohydrocarbons such as nitromethane, nitrobenzene or nitrotoluene; amides such as dimethyl formamide or dimethyl acetamide; and mixtures thereof.

Suitable inorganic or organic bases are those mentioned in GB-PS 1,007,790.

The process according to the invention is generally carried out at temperatures in the range of from $-40°$ C to $+65°$ C and preferably at temperatures in the range of from $0°$ to $30°$ C. In cases where cyanogen chloride is used, the reaction is preferably carried out below the boiling point ($13°$ C), although where cyanogen bromide is used the reaction may even be carried out at temperatures above $50°$ C.

In general, the aminophenols or amino(alkyl)phenols, the inorganic and/or organic base, dissolved or suspended in the solvent, are added with thorough stirring to a solution of the cyanogen halide in the solvent. The cyanic acid esters containing cyanamide groups which are formed may readily be freed from the inorganic or organic salts adhering to them by extraction and isolated by methods known per se, such as filtration, vacuum filtration or centrifuging.

Tertiary amines, which are generally used in catalytic quantities (0.001 to 10% by weight, more especially 0.001 to 1.0% by weight, based on alkali or alkaline earth phenolate) in accordance with our copending U.S. Application, Ser. No. 658,815, filed Feb. 17, 1976, correspond to the general formula:

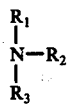

in which
R$_1$, R$_2$, R$_3$ = alkyl, aryl and cycloalkyl radicals which do not have to be the same as one another, with from 1 to 36 carbon atoms, more especially with up to 18 carbon atoms,
such as for example trimethylamine, triethylamine, methyl diethylamine, tripropylamine, tributylamine, methyl dibutylamine, dinonyl methylamine, dimethyl stearylamine, dimethyl cyclohexylamine and diethyl aniline.

Cyanogen chloride and cyanogen bromide, both readily available on a commercial scale, are particularly suitable for use as the cyanogen halide component.

This process is particularly suitable for continuous production. To this end, the aminophenols or amino(alkyl) phenols, the cyanogen halide, the inorganic and/or organic base and, optionally, the tertiary amine are continuously pumped into a mixing chamber in which the cyanic acid ester containing cyanamide groups is instantaneously formed.

The aromatic cyanic acid esters containing cyanamide groups obtained in accordance with the invention may be reacted by heating to $65° - 150°$ C, preferably to $70° - 100°$ C, optionally in solution and optionally in the presence of a catalyst or catalyst mixture, to form uncrosslinked prepolymers (B) which are soluble in organic solvents. The prepolymers represent polymeric N-cyanoisourea ethers of liquid, wax-like or solid consistency and are soluble in organic solvents. They are highly stable in storage. As shown by the IR-spectrum, they contain hardly any triazine structures, but instead show the bands of the N—C|N—group at 4.5 $\mu$ and of the C=NH-group at 5.9 $\mu$.

The prepolymers may be converted into high molecular weight polymers (C) of triazine structure by heating to $150° - 350°$ C, preferably to $150° - 250°$ C, optionally in solution and optionally in the presence of a catalyst or catalyst mixture. The end products are substantially insoluble in solvents and are infusible. As shown by the infrared spectrum, the polymer does not contain any other crosslinking principles apart from triazine structures. The formation of the high molecular weight polymers with triazine structures is indicative of the fact that the cyanic acid ester and cyanamide groups have participated equally in the formation of the triazine ring.

Catalysts suitable for use in the production of the prepolymer and high molecular weight end polymer with triazine structures include acids, bases, salts, nitrogen and phosphorus compounds, for example Lewis acids such as AlCl$_3$, BF$_3$, FeCl$_3$, TiCl$_4$, ZnCl$_2$ or SnCl$_4$; proton acids such as HCl or H$_3$PO$_4$; aromatic hydroxy compounds such as phenol, p-nitrophenol, pyrocatechol or dihydroxy naphthalene; sodium hydroxide, sodium methylate, sodium phenolate, trimethylamine, triethylamine, tributylamine, diaza-bicyclo(2,2,2)-octane, quinoline, isoquinoline, tetrahydroisoquinoline, tetraethyl ammonium chloride, pyridine-N-oxide, tributyl phosphine, phospholine-$\Delta^3$-1-oxa-1-phenyl, zinc octoate, tin octoate, zinc naphthenate, and mixtures thereof.

The catalysts may be used in quantities of from 0.001 to 10% by weight, based on the prepolymer or cyanic acid ester containing cyanamide groups, or if desired in even larger quantities.

The prepolymers may be used in solution in inert solvents, such as acetone, benzene, xylene, chlorobenzene, ethylacetate, tetrahydrofuran, dibutyl ether, dimethyl formamide, or in powder form, for the production of coatings on such substrates as metals, ceramics, glass or earthenware, etc., or in solution in organic solvents as impregnating lacquers or laminating resins. If desired, the prepolymers may be combined with fillers, pigments, glass fibres, metal fibres and glass cloths and used for the production of shaped articles or laminates. Yellow to brown, transparent, extremely hard and temperature-resistant end products are obtained after hardening.

The percentage contents and parts quoted in the Examples relate to weight, unless otherwise indicated.

EXAMPLE 1 a. 55 g (0.5 mol) of m-aminophenol are dissolved in 500 ml of isopropanol in a 1 liter three-necked flask equipped with a stirrer, thermometer and dropping funnel. A solution, precooled to $0°$ C, of 55.0 ml (1.10 mol) of cyanogen chloride in 50 ml of isopropanol is slowly added dropwise with stirring to the resulting solution at a temperature of $0°$ C. On completion of the reaction, a solution of 106 g (1.05 mol) of triethylamine in 50 ml of isopropanol is pumped in below the surface at $0°$ C by means of a metering pump. The reaction mixture is then stirred for 2 hours at room temperature. The product which precipitates is filtered off under suction, washed with 50 ml of isopropanol, subsequently taken up in 500 ml of dichloroethane and the triethyl ammonium chloride is extracted with water. Removal of the solvent by distillation at room temperature leaves the crude m-cyanatophenyl cyanamide which, in the IR-spectrum, shows two absorption bands characteristic of the cyanamide and the cyanate group in the region of 4.5 μ.

b. The dichloroethane solution of the m-cyanatophenyl cyanamide obtained in accordance with (a) is boiled under reflux for 2 hours. Removal of the solvent by distillation leaves 76 g (95% of the theoretical) of the polymeric N-cyanoisourea ether of which the IR-spectrum, in addition to the band characteristic of the cyanamide group at 4.5 μ, also shows an isourea ether band at 5.9 μ, whilst the —OCN band at 4.5 μ is missing.

c. 10 g of the polymeric N-cyano-isourea ether are heated for 3 hours to 200° C with 0.1 g of anhydrous zinc chloride in 50 ml of sulpholane. A pale brown polytriazine which is insoluble in sulpholane is obtained. Its infrared spectrum does not show any absorption bands (region 4.5 μ and 5.9 μ), but instead shows the bands characteristic of the s-triazine ring in the region of 6.4 μ and 7.25 μ.

5 g of the polymeric N-cyano-isourea ether are heated for 2 hours to 300° C with 0.05 g of anhydrous zinc chloride. A brown coloured polytriazine with the above-mentioned spectroscopic properties is obtained.

EXAMPLE 2

Using the apparatus as described in Example 1, 62 g (0.5 mol) of 2-methyl-4-aminophenol, dissolved in 500 mol of methylene chloride, are reacted with 55 ml (1.1 mol) of cyanogen chloride at 0° C. 106 g (1.05 mol) of triethylamine are then pumped into the reaction mixture at 0° C. On completion of the reaction, the reaction mixture is stirred for 2 hours at room temperature, after which the triethyl ammonium chloride precipitated is filtered off under suction and washed with 100 ml of methylene chloride. The combined methylene chloride phases are washed with water until free from chloride. After the solvent has been distilled off, the residue is kept at 90° C for 1 hour during which the cyanate containing cyanamide groups polymerises into the polymeric N-cyano-isourea ether. (IR-spectrum: N—CN: at 4.5 μ, C≡NH: at 5.9 μ).

5 g of the polymeric N-cyano-isourea ether are heated for 2 hours to 250° C with 0.05 g of tin(IV)chloride. 5 g of brown polytriazine (IR: s-triazine band at 6.4 μ and 7.25 μ) are obtained.

EXAMPLE 3

72 g (0.5 mol) of 3-chloro-4-aminophenol and 55 ml (1.1 mol) of cyanogen chloride are reacted in 750 ml of toluene at 0° C. 106 g (1.05 mol) of triethylamine dissolved in 50 ml of toluene are then slowly introduced into the reaction mixture at 0° C. On completion of the reaction, the triethyl ammonium chloride precipitated is filtered off under suction, and washed with toluene, and the combined toluene phases are washed with water until free from chloride. (The cyanic acid ester containing cyanamide groups can be obtained by distilling off the solvent at room temperature). The toluene solution obtained as described above is boiled under reflux for 2 hours. Removal of the solvent leaves 95 g (98.5% of the theoretical) of polymeric N-cyano-isourea ether. (IR-spectrum: N—CN-band at 4.5 μ, C≡NH-band at 5.9 μ).

7 g of the polymeric N-cyano-isourea ether are heated for 4 hours to 230° C with 0.1 g of zinc octoate, giving 7 g of a brown coloured polytriazine with the IR-bands characteristic of the s-triazine ring at 6.4 μ and 7.25 μ.

EXAMPLE 4

137 g (1 mol) of 2,6-dimethyl-3-aminophenol and 65 ml (1.3 mol) of cyanogen chloride are introduced at 0° C into 500 ml of methanol and 200 ml of water. A solution of 165 g (1.2 mol) of potassium carbonate in 200 ml of water is then added dropwise with stirring. On completion of the reaction, the excess cyanogen chloride and the methanol are distilled off in vacuo. The 3,5-dimethyl-4-hydroxyphenyl cyanamide precipitated is filtered off under suction. 81 g (0.5 mol) of the cyanamide thus obtained and 27 ml (0.55 mol) of cyanogen chloride are dissolved in 500 ml of isopropanol at 0° C. 53 g (0.503 mol) of triethylamine are then pumped in below the surface of this solution with thorough stirring using a metering pump. On completion of the reaction, the reaction mixture is poured onto 1.5 liters of ice and the reaction product is extracted with propylene chloride. After drying with sodium sulphate, the organic phase is boiled under reflux for 3 hours. The solvent is then distilled off, giving 85 g (91% of the theoretical) of polymeric N- cyano-isourea ether. (IR-spectrum: N—C≡N-band at 4.5 μ, c≡NH-band at 5.9 μ).

5 g of the polymeric N-cyano-isourea ether are heated for 5 hours to 250° C with 0.5 g of pyrocatechol and 0.5 g of diaza-bicyclo-[2,2,2]-octane. 5 g of red-brown polytriazine are obtained. (IR-spectrum: s-triazine bands at 6.4 μ and 7.25 μ, no absorption at 4.5 μ or 5.9 μ).

EXAMPLE 5

75 g (0.5 mol) of 2,3,5-trimethyl-4-aminophenol are reacted with 55 ml (1.1 mol) of cyanogen chloride and 106 g (1.05 mol) of triethylamine at 0° C in 500 ml of isopropanol in the same way as described in Example 1. The reaction product precipitated is taken up in 300 ml of perchloroethylene and washed with water until free from chloride. The organic phase is boiled under reflux for 3 hours. Removal of the solvent by distillation leaves 90 g (89% of the theoretical) of polymeric N-cyano-isourea ether.

5 g of the polymeric N-cyano-isourea ether are heated for 2 hours to 190° C with 0.15 g of tin octoate. 5 g of brown-coloured polytriazine with the characteristic s-triazine bands in the IR-spectrum at 6.4 μ and 7.25 μ are obtained.

EXAMPLE 6

In the same way as described in Example 1, 80 g (0.5 mol) of 5-amino-α-naphthol are reacted with 55 ml (1.1 mol) of cyanogen chloride and 106 g (1.05 mol) of triethylamine in 500 ml of isopropanol at a temperature of 0° C. The dichloroethane phase thus obtained is boiled under reflux for 3 hours. Removal of the solvent by distillation leaves 89 g (85% of the theoretical) of polymeric N-cyano-isourea ether.

10 g of the polymeric N-cyano-isourea ether are heated for 4 hours to 200° C with 0.2 g of zinc octoate. An extremely hard brown polytriazine is obtained. (IR-spectrum: s-triazine bands at 6.4 μ and 7.25 μ).

EXAMPLE 7

In the same way as described in Example 1, 114 g (0.5 mol) of 2-(4-aminophenyl)-2-(4-hydroxyphenyl)-propane are reacted with 55 ml (1.1 mol) of cyanogen chloride and 106 g (1.05 mol) of triethylamine in 500 ml of isopropanol. The dichloroethane phase is then boiled under reflux for 2 hours. Removal of the solvent leaves 134 g (96% of the theoretical) of polymeric N-cyano-isourea ether. (IR-spectrum: N—C≡N-band at 4.5 μ, C=NH-band at 5.9 μ). 10 g of the polymeric N-cyano-isourea ether are heated for 1.5 hours to 180° C with 0.5 g of zinc octoate. A deep brown coloured, very hard polytriazine is obtained.

EXAMPLE 8

In the same way as described in Example 1, 100 g (0.5 mol) of 4-amino-4'-hydroxydiphenyl ether are reacted with 55 ml (1.1 mol) of cyanogen chloride and 106 g (1.05 mol) of triethylamine in 500 ml of isopropanol. The dichloroethane phase thus obtained is subsequently boiled under reflux for 3.5 hours. Removal of the solvent by distillation leaves 119 g (95% of the theoretical) of polymeric N-cyano-isourea ether, which hardens over a period of 4 hours at 220° C in the presence of 3% by weight of zinc octoate to form a hard dark-coloured polytriazine.

EXAMPLE 9

In the same way as described in Example 1, 125 g (0.5 mol) of 4-amino-4'-hydroxydiphenyl sulphone are reacted with 55 ml (1.1 mol) of cyanogen chloride and 106 g (1.05 mol) of triethylamine in 600 ml of isopropanol. The ethylene chloride phase thus obtained is boiled under reflux for 2 hours. Removal of the solvent by distillation leaves 138 g (92% of the theoretical) of polymeric N-cyano-isourea ether which, after heating for 6 hours to 280° – 300° C, forms a very dark-coloured, extremely hard polytriazine.

EXAMPLE 10

As described in Example 1, 93 g (0.5 mol) of 4-amino-4'-hydroxy-diphenyl are reacted with 55 ml (1.1 mol) of cyanogen chloride and 106 g (1.05 mol) of triethylamine in 500 ml of isopropanol. The ethylene chloride solution is boiled under reflux for 2.5 hours. Working up gives 110 g (94% of the theoretical) of polymeric N-cyano-isourea ether which, by heating for 4 hours to 230° C in the presence of 3.5% by weight of zinc octoate, forms a brown-coloured polytriazine.

We claim:

1. A process for producing a high molecular weight polytriazine which comprises reacting (1) a compound of the formula

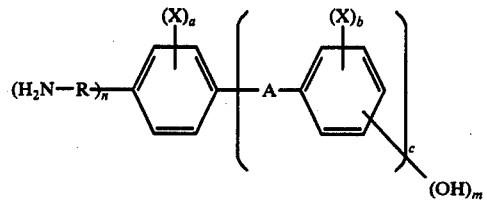

wherein
R is a bond, alkylene having 1 to 9 carbon atoms or said alkylene substituted by phenyl or by alkyl having 1 to 4 carbon atoms;
X is hydrogen, halogen, alkyl having 1 to 9 carbon atoms,

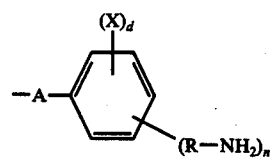

or phenyl, or two X substituents together on adjacent carbon atoms of the phenylene moiety to which they are attached together from a hydrocarbon ring containing from 5 to 6 carbon atoms or together form in conjunction with O, S, N or P a 5 or 6-membered heterocyclic ring;
A is

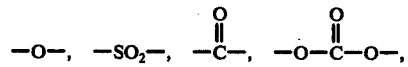

alkylene having 1 to 9 carbon or said alkylene substituted by phenyl or by alkyl having 1 to 4 carbon atoms, a 5 or 6-membered cycloaliphatic or aromatic ring or a bond;
$n$ is 1, 2 or 3;
$m$ is 1, 2 or 3;
$a$ is $5-n$ when $c$ is 1 and $6-m-n$ when $c$ is 0;
$b$ is $5-m$;
$c$ is 0 or 1 and
$d$ is $5-n$
in the presence of an inorganic base or a tertiary amine or (2) a phenolate of said formula with cyanogen halide in the presence of a catalytic amount of a tertiary amine at a temperature from −40° to 65° C to thereby form the corresponding aromatic cyanic acid ester containing cyanamide groups; heating said ester at a temperature of from 65° to 150° C to thereby form a prepolymer soluble in organic solvents and heating said prepolymer at a temperature of from 150° to 350° C to form a high molecular weight polytriazine.

2. The polytriazine produced by the process of claim 1.

* * * * *